Nov. 24, 1931. A. A. MORTON 1,833,432
DEVICE FOR MAINTAINING SUPPORTING STRUCTURES IN A STATE OF EQUILIBRIUM
AT VARYING DISTANCES FROM THE SUPPORTING CENTERS
Filed Dec. 11, 1928 4 Sheets-Sheet 2

Inventor
Albert A. Morton
By Thomas Bieyer
Attorney

Albert A. Morton, Inventor
By Thomas Belyue, Attorney

Nov. 24, 1931.   A. A. MORTON   1,833,432
DEVICE FOR MAINTAINING SUPPORTING STRUCTURES IN A STATE OF EQUILIBRIUM
AT VARYING DISTANCES FROM THE SUPPORTING CENTERS
Filed Dec. 11, 1928   4 Sheets-Sheet 4

Inventor
Albert A. Morton
By Thomas Riley
Attorney

Patented Nov. 24, 1931

1,833,432

UNITED STATES PATENT OFFICE

ALBERT A. MORTON, OF OREGON CITY, OREGON

DEVICE FOR MAINTAINING SUPPORTING STRUCTURES IN A STATE OF EQUILIBRIUM AT VARYING DISTANCES FROM THE SUPPORTING CENTERS

Application filed December 11, 1928. Serial No. 325,348.

This invention relates to my United States Patent Number 1,681,424 issued August 21, 1928, upon a mechanical device.

The primary object of my invention is for maintaining a supporting mechanism in a state of equilibrium irrespective of the distance of the load to be supported relative to the supporting center.

A further object of my invention resides in a mechanism that will be maintained in a state of equilibrium irrespective of the load or the location of the load in relationship to the center of support of the supporting mechanism.

My invention is primarily intended for use in industries, as in bridge construction, scaffolding, storage buildings, platform supports in building construction, paving plants, and any and all places where it is found desirable or necessary in the supporting of a variable load, at a variable distance from the supporting center, and for maintaining the supporting mechanism in a state of equilibrium irrespective of the weight or of its distance from the center of the support.

A further object of my invention resides in a simplified construction, one that may be used over relatively long periods with freedom from alteration, adjustment and repair, and that may be operated by relatively inexperienced mechanical operators.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
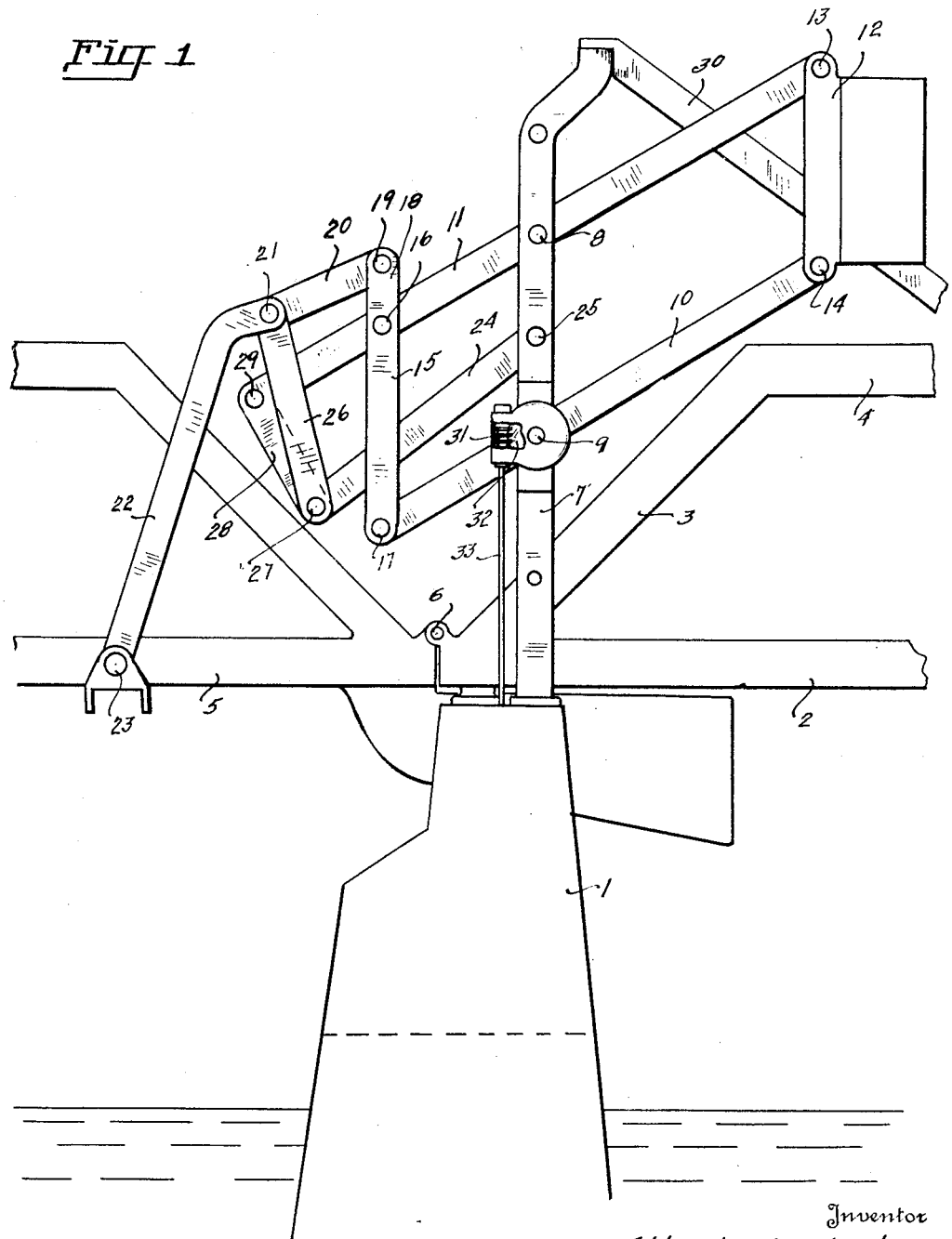
Fig. 1 is a side elevation of mechanism suitable for use in bridge operation.
Figure 2:
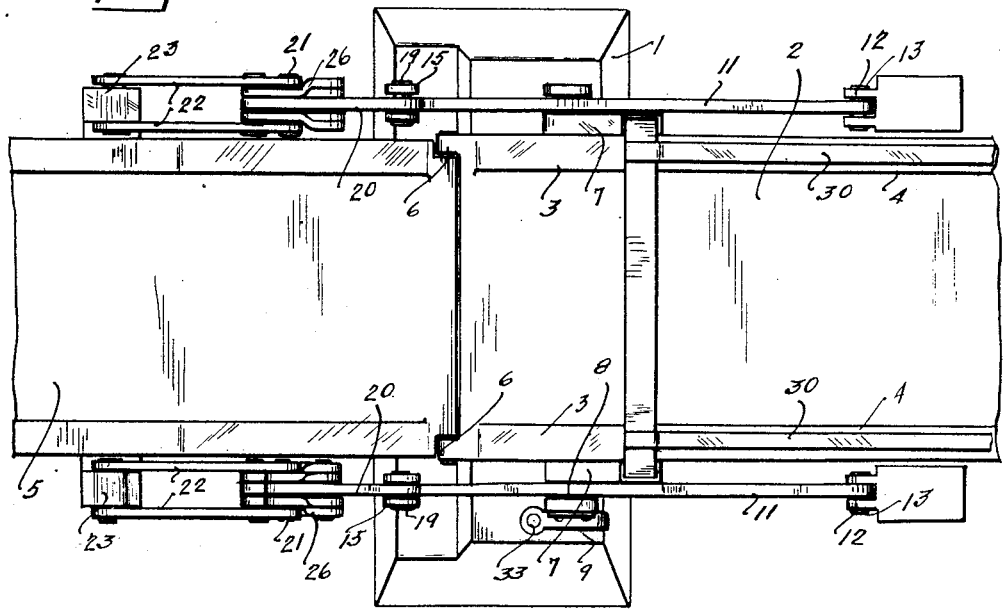
Fig. 2 is a top, plan view of the mechanism illustrated in Fig. 1.

1 is a primary supporting base, as a bridge pier, and 2 is a bottom chord of a bridge span, and 3 is the end post or end chord of the bridge structure. 4 is the top chord of the bridge. An adjustable leaf 5 of the bridge is journaled about a supporting journal pin 6. A central supporting column 7, is disposed upon the base 1, and upwardly extending therefrom. Journal pins 8 and 9 are disposed within suitable bearing blocks mounted within the supporting column 7, and parallelly disposed link members 10 and 11 are pivotally mounted upon the journal pins 8 and 9. A counterweighted link 12 is disposed upon the free end of the links 10 and 11 and is journaled relative thereto about the journal pins 13 and 14; in small structures the counterweight may not be found necessary. End link posts 15 are journaled relative to the oppositely disposed links 10 and 11 and are actuated and supported upon the journal pins 16 and 17 coacting between the associated members. The upper end 18 of the links 15 extend above the top link 11 and terminates in the journal pin 19 to which a short link 20 is journaled upon its one end. The oppositely disposed end of the link 20 carries a journal pin 21 from which the actuating link 22 depends. The actuating link 22 is supported upon its lower end by a journal pin 23 mounted within, and carried upon, the leaf span 5 of the bridge member to be raised and lowered. The half link 24 is disposed substantially half way between links 10 and 11 and is journaled upon its one end about the journal pin 25 disposed within a suitable bearing within the column 7. Upon the oppositely disposed end of the half link 24 is a compression member 26. The compression member 26 is journaled about the journal pin 27, and depends from the journal pin 21. The journal pin 27 is disposed upon the free end of the half link 24. A short link 28 is also journaled about the journal pin 27 and about the journal pin 29 disposed in the outwardly extending end of the link 11. The link 11 is longer in longitudinal length than the link 10. A rear strut 30 is secured to the upper end of the post 7, the purpose of which is to maintain the column 7 in a state of equilibrium. In order to actuate the supporting mechanism relative to the lift leaf or draw span of the bridge, a bull worm gear 32 is disposed upon or about the shaft or journal pin 9 to which the link 10 is secured and the rotation or partial rotation of the bull worm wheel 32 rotates or partially rotates the shaft or journal pin 9, and therefore rocks or imparts a rocking motion to the link 10 and the associated elements. A worm 31 is adapted to coact with the bull worm wheel 32; the worm 31 being mounted upon and being adapted to being driven by the shaft 33. The shaft 33 is rotated by a mechanism not here shown which may be of any suitable driving mechanism that is adapted for the power and loads to be actuated.

Figure 8:
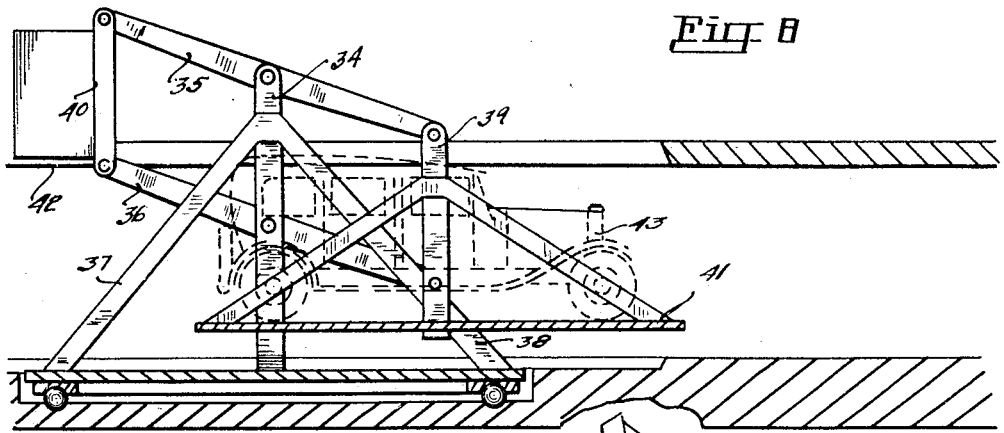
Fig. 8 is a side elevation, partially in section, illustrating my device in use for the raising, lowering and locating of a platform upon which may be positioned an automotive vehicle or other article to be raised, lowered or positioned.
Figure 9:
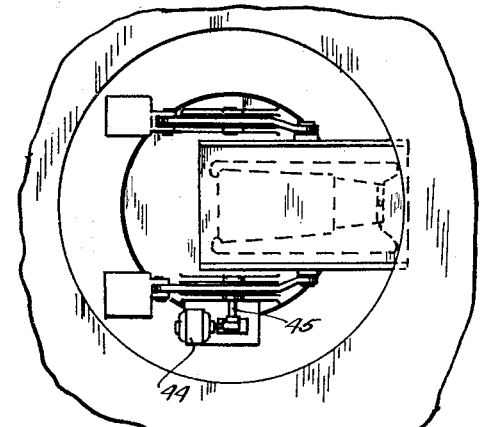
Fig. 9 is a top, plan view of the mechanism illustrated in Fig. 8.
Figure 3:
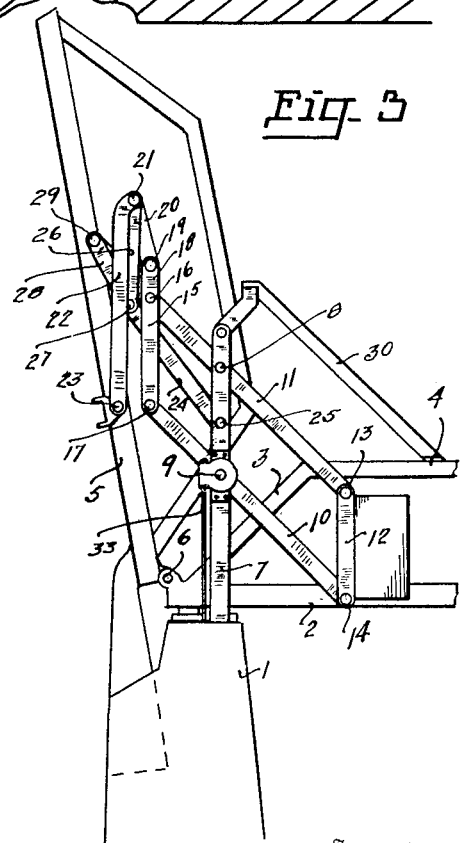
Fig. 3 is a side elevation of the mechanism, illustrated in Fig. 1, wherein the bridge lift is illustrated in raised position.
Figure 4:
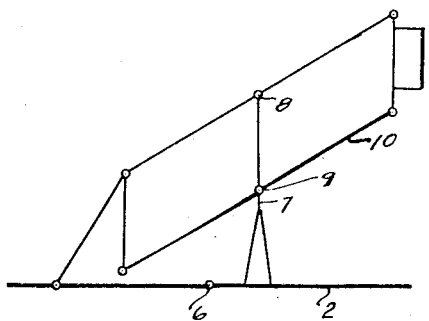
Fig. 4 is a diagrammatical lay-out of a simplified form of mechanism, illustrating the principle of my invention and illustrating the same with the lift end in maximum lowered position.
Figure 6:
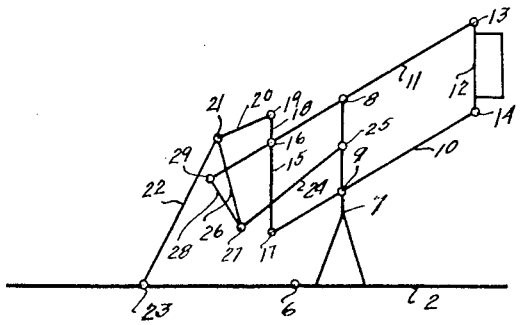
Fig. 6 is a diagrammatical lay-out of the mechanism illustrated in Fig. 1, with the same illustrating the device in a maximum lowered position on the operating end of the device.
Figure 5:
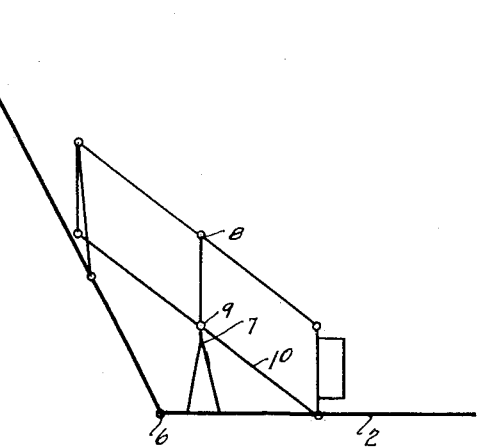
Fig. 5 is a diagrammatical lay-out of the mechanism illustrated in Fig. 4, with the lift end of the mechanism illustrated in the maximum raised position.
Figure 7:
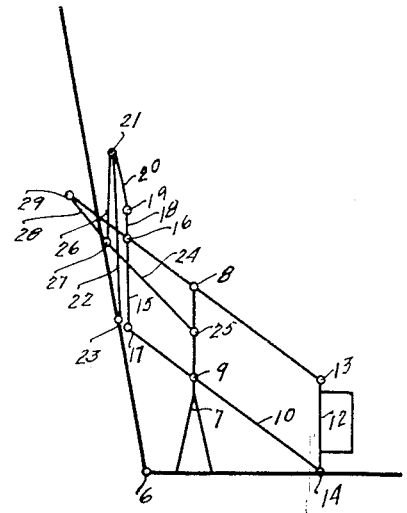
Fig. 7 is a diagrammatical lay-out of the mechanism in Fig. 6, with the device illustrated in the maximum raised position.

The mechanism may be made as illustrated in Fig. 8 and in Fig. 9, wherein a central column 34 supports parallelly disposed links 35 and 36. The column 34 is supported in vertical position by any suitable supporting mechanism as by a frame 37 and 38. End links 39 and 40 are secured to the oppositely disposed ends of the top and bottom links 35 and 36 and the end link 39 carries a supporting platform 41. The link 40 carries a counterbalance weight 42. The counterbalance 42 may be made in the form of a tank adapted to having fluids pumped thereinto and therefrom in order to adapt the counterbalance to a weight as a motor vehicle 43 to be mounted upon a platform. The raising and lowering of the counterbalanced links and associate elements may be accomplished through hand manipulation or by suitable power means, not here shown. The platform 41 may be mounted between the counterbalance link mechanisms illustrated in Fig. 9, and the raising and lowering of the platform 41 disposed upon the links, may be accomplished through the use of any suitable prime mover, as an electric motor 44, adapted to coact with the train of gearing for the rotation of the shaft 45, for rotating the gears mounted upon the journal pins disposed within the column 34 and to which the links 35 and 36 may be attached.

Figure 10:
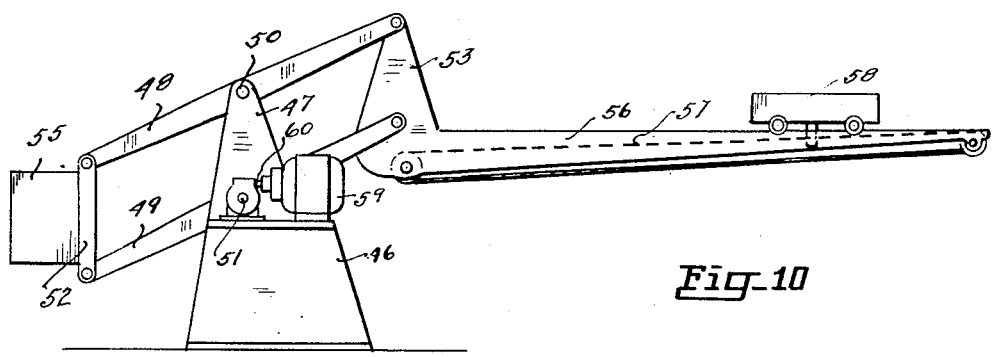
Fig. 10 is a side elevation of a further application of my device shown in position for the manipulating of a load at different positions and at variable distances from the center of support.

My device may be used in conjunction with the handling of variable loads or for the handling of definite loads at variable distances from the supporting central standard, as illustrated in Fig. 10, wherein the supporting block 46 may be mounted as a stationary block upon a definite location or the same may be mounted upon a portable supporting member, as a railway truck or an automotive vehicle, or the supporting element 46 may be mounted within a parapet and associated elements be utilized for the handling of disappearing guns for fortification, or for any other useful purpose. The supporting block 46 has mounted thereupon supporting tower 47, to which oppositely and parallelly disposed links 48 and 49 are mounted. The parallelly disposed links are mounted relative to the supporting tower 47 upon any supporting suitable journal pins 50 and 51 disposed within the tower. End links 52 and 53 secure parallelly disposed links 48 and 49 together upon their oppositely disposed ends with the counterbalance 55 mounted on the link 52. A supporting platform 56 outwardly extends from the supporting link 53, and has a track 57 extending longitudinally thereupon upon which a portable carriage 58 is mounted. The carriage 58 is adapted to movement longitudinally of the supporting platform, by any suitable power actuating mechanism. The raising and lowering of the platform 56 may be accomplished by prime mover 59 mounted upon the platform 46, which is adapted to coact through a reduction gear mounted upon the shaft of the prime mover and to coact with the worm gear and the worm pinion mounted within the housing 61. The driving element has a worm gear mounted upon the shaft 60. The rotation of the shaft 51 in one direction raises the platform 56 and the rotation of the shaft 51 in the opposite direction lowers the platform 56.

Since the platform is adapted for being placed in different horizontal planes by the driving elements attached to the lowermost pair of parallelly disposed links, the load to be placed upon platform 56 may be delivered at different elevations and at any position within the range of the platform. While it is true that the value of the counterweight 55 varies according to the position of the carriage 58 disposed upon the platform 56, yet within certain limits, after the platform and the counterweighted balance 55 have been placed in a state of equilibrium, the state of equilibrium will be maintained irrespective of the location of the carriage 58 upon the platform 56 in view of the arrangement of the links.

I do not wish to be limited in the application of my new and improved structure to any specific purpose, as it is susceptible of use for a great number of purposes and in a varied number of industries.

I claim:

1. In a device of the class described, the combination of a supporting element, a tower upwardly extending from said supporting element, links disposed in spaced relation rockably mounted relative to the tower, end links hingedly mounted relative to the other of said links and so arranged as to form a parallelogram, an outwardly extending platform secured to one of said links and means for imparting a rocking motion to the elements forming the parallelogram.

2. In a device of the class described, the combination of a supporting base, pairs of supporting elements disposed in spaced relation upwardly extending from the base, pairs of elements hingedly secured together to form a parallelogram rockably disposed upon bearings disposed within the supporting elements, a platform disposed between the parallelogram forming sides and means for imparting a rocking motion to the elements forming the parallelogram.

3. In a device of the class described, the combination of a supporting base, supporting columns extending from the base, pairs of parallelogram forming elements hingedly secured together and rockably mounted relative to the supporting column and a platform disposed between the parallelogram forming elements.

4. In a device of the class described, the combination of a supporting base, supporting columns disposed in spaced relation upwardly extending from the base, pairs of parallelogram forming elements hingedly secured together and rockably mounted relative to the supporting columns, a platform disposed between the parallelogram forming elements and secured thereto, and power means for imparting a rocking motion to the parallelogram associated elements, to raise and lower the platform.

ALBERT A. MORTON.